United States Patent
Pan et al.

(10) Patent No.: US 10,045,411 B2
(45) Date of Patent: Aug. 7, 2018

(54) DUAL MODE LIGHT EMITTING DIODE (LED) DRIVER

(71) Applicant: AVAGO TECHNOLOGIES GENERAL IP (SINGAPORE) PTE. LTD., Singapore (SG)

(72) Inventors: Hui Pan, Coto De Caza, CA (US); Jingguang Wang, Aliso Viejo, CA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 0 days.

(21) Appl. No.: 15/596,665

(22) Filed: May 16, 2017

(65) Prior Publication Data
US 2017/0339761 A1 Nov. 23, 2017

Related U.S. Application Data

(60) Provisional application No. 62/338,182, filed on May 18, 2016, provisional application No. 62/338,253, filed on May 18, 2016.

(51) Int. Cl.
*H05B 37/02* (2006.01)
*H05B 33/08* (2006.01)

(52) U.S. Cl.
CPC ..... *H05B 33/0845* (2013.01); *H05B 33/0815* (2013.01)

(58) Field of Classification Search
CPC ............ H05B 33/0815; H05B 33/0845; H05B 33/0851
USPC ................................. 315/186, 225, 294, 307
See application file for complete search history.

(56) References Cited

U.S. PATENT DOCUMENTS

| | | | | |
|---|---|---|---|---|
| 2009/0015178 A1* | 1/2009 | Liu | ..................... | H05B 33/0815 315/297 |
| 2009/0302776 A1* | 12/2009 | Szczeszynski | ..... | H05B 33/0815 315/246 |
| 2011/0298395 A1* | 12/2011 | Kawai | ..................... | H02M 1/44 315/307 |
| 2013/0009556 A1* | 1/2013 | Szczeszynski | ........... | H03K 7/08 315/185 R |
| 2014/0043879 A1* | 2/2014 | Eum | ..................... | H02M 7/217 363/89 |
| 2014/0091723 A1* | 4/2014 | Kuo | ................... | H05B 33/0818 315/200 R |

* cited by examiner

*Primary Examiner* — Tung X Le
(74) *Attorney, Agent, or Firm* — Oblon, McClelland, Maier & Neustadt, L.L.P.

(57) ABSTRACT

Described herein is a device comprising circuitry configured to determine, based on an input signal level, one of a first mode of operation and a second mode of operation for a light-emitting-diode (LED) driver. The circuitry activates a loop-filter associated with the first mode of operation of the LED driver in response to the input signal level being below a predetermined threshold. Moreover, the circuitry activates a pulse modulator associated with the second mode of operation of the LED driver in response to the input signal level being above the predetermined threshold.

17 Claims, 9 Drawing Sheets

DUAL MODE LIGHT EMITTING DIODE (LED) DRIVER

CROSS-REFERENCE TO RELATED APPLICATIONS

The present application claims the benefit of the earlier filing date of U.S. Provisional Application 62/338,182, filed in the United States Patent and Trademark Office on May 18, 2016, and the filing date of U.S. Provisional Application 62/338,253 filed in the United States Patent and Trademark Office on May 18, 2016. The entire contents of these provisional applications are incorporated herein by reference.

TECHNICAL FIELD

The present disclosure is directed to light-emitting diode (LED) driving circuits. Specifically, the present disclosure is related to a multi-mode LED driver that achieves a wide dynamic range dimming functionality.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

LED lighting technology is extensively used in a variety of applications. LED lighting typically includes a plurality of LEDs that are driven by a LED driver circuit. Further, LED lighting applications are typically driven by smart and power-efficient lighting and light-fidelity (Li-Fi) communication. The LED drivers can be used to control an intensity of light output by one or more LEDs, by outputting signals to an LED circuit that have predetermined current and pulse characteristics. However, most of the commonly used LED drivers either consume an excessive amount of power while operating in the constant current (CC) mode, and therefore suffer from thermal issues that prevent the LED drivers from being used for high-brightness lighting applications, or cause electromagnetic interference and low frequency flicker issues while operating in a power-efficient switched inductor (SI) mode.

Accordingly, there is a requirement for an improved LED driver that has a wide dynamic range and high power efficiency direct current dimming and can be used in diverse applications.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1A:
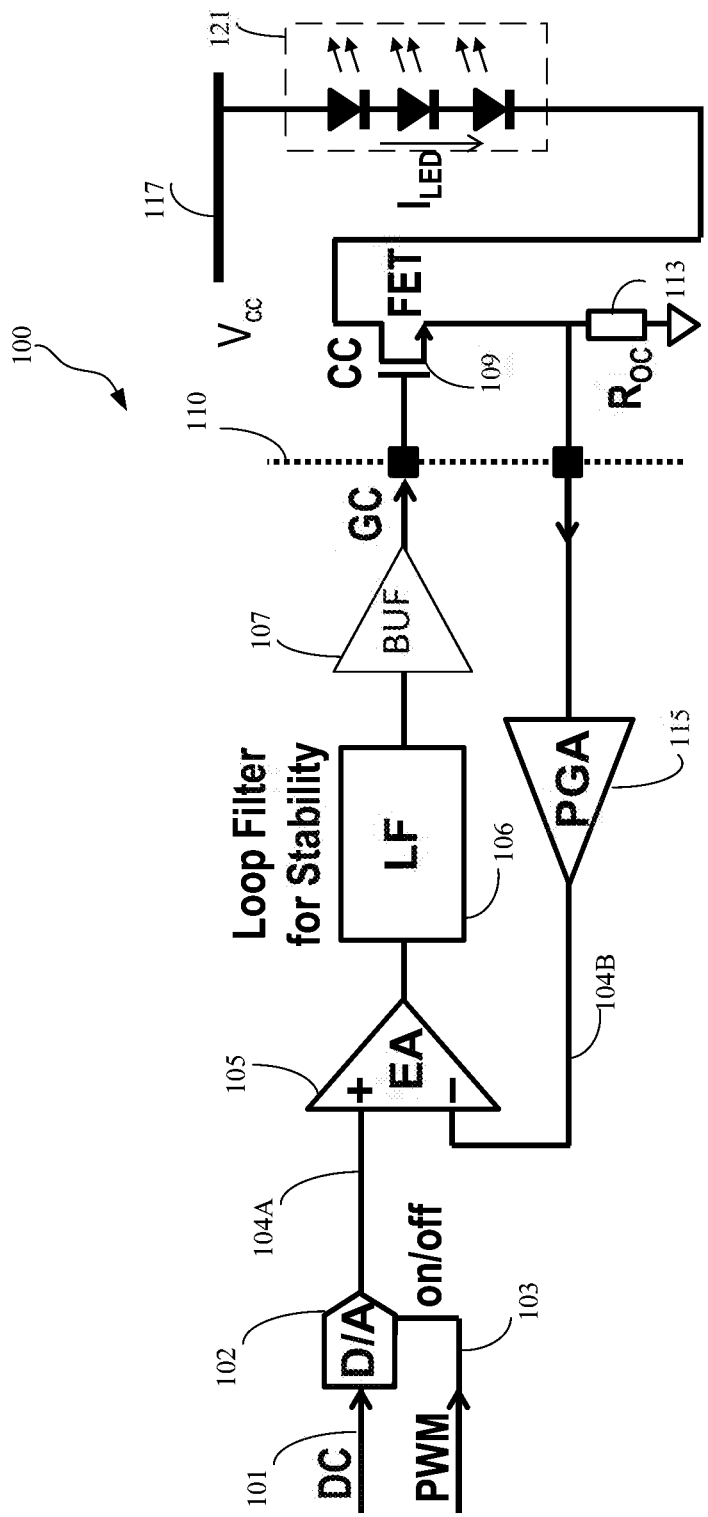
FIG. 1A depicts according to an embodiment, an exemplary schematic diagram of a light-emitting diode (LED) driver.

In the drawings, like reference numerals designate identical or corresponding parts throughout the several views. Further, as used herein, the words "a," "an" and the like generally carry a meaning of "one or more," unless stated otherwise.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

An aspect of the present disclosure provides for a device including circuitry configured to determine, based on an input signal level, one of a first mode of operation and a second mode of operation for a light-emitting-diode (LED) driver. The circuitry activates a loop-filter associated with the first mode of operation of the LED driver, in response to the input signal level being below a predetermined threshold. Moreover, the circuitry is configured to activate a pulse modulator associated with the second mode of operation of the LED driver in response to the input signal level being above the predetermined threshold.

An aspect of the present disclosure provides for a method of operating a light-emitting-diode (LED) driver. The method includes at least the steps of: determining by circuitry, based on an input signal level, one of a constant current mode of operation and a switched inductor mode of operation for the LED driver. Further, the method includes the steps of activating by the circuitry, a loop-filter associated with the constant current mode of operation of the LED driver in response to the input signal level being below a predetermined threshold, and activating by the circuitry, a pulse modulator associated with the switched inductor mode of operation of the LED driver in response to the input signal level being above the predetermined threshold.

By one aspect of the present disclosure, there is provided an apparatus comprising: a filter configured to operate a light-emitting-diode (LED) driver in a first mode of operation, the filter being activated in response to an input signal level being below a predetermined threshold; and a pulse modulator configured to convert the input signal into a pulse signal, and operate the LED driver in a second mode of operation based on the pulse signal, the pulse modulator being activated in response to the input signal level being greater than the predetermined threshold.

Turning to FIG. 1A, there is depicted an exemplary schematic diagram of a light-emitting diode (LED) driver 100 according to one embodiment of the present disclosure. As shown in FIG. 1A, an input direct current (DC) signal 101 is input to a high-resolution digital-to-analog converter (DAC) 102. A pulse-width modulated (PWM) signal 103 is also input to the DAC 102, in order to generate a constant reference voltage signal 104A as the output of the DAC 102. The constant reference voltage signal 104A is input to a first terminal (positive terminal) of an error amplifier (EA) comparator 105. A feedback signal 104B is input to a second terminal (negative terminal) of the EA 105. The EA 105 computes a difference in the two input signals and transmits the difference (i.e., error) signal to a low pass filter (LF) 106.

The output of the low pass filter 106 is passed to a buffer 107, which is used to change a current/voltage level of the signal based on a load that is attached to the driver. The output of the buffer 107 is a gate control (GC) signal that is transmitted to a driver/LED interface 110. The interface 110 can include one or more components that generate an LED current level from input power.

By one embodiment, the LED driver 100 of FIG. 1A includes a field-effect-transistor (FET) 109, which includes a resistor ($R_{OC}$) 113 that is connected at one end to a source terminal of the FET 109. The other end of the resistor 113 is connected to a ground terminal. Further, a plurality of LEDs (i.e., a load) 121 is connected at one end to a drain terminal of the FET 109, and connected at another end to a constant voltage source ($V_{CC}$) 117.

The LED driver 100 includes a high-gain feedback loop that is formed by sensing a voltage across the resistor ($R_{OC}$) 113. The sensed voltage is passed to a programmable gate amplifier (PGA) 115. As shown in FIG. 1A, the output of the PGA 115 forms the feedback signal 104B, which is input to the second terminal of the EA 105. The high-gain feedback loop provisions for generating the GC signal that drives the FET 109. In this manner, the LED driver 100 of FIG. 1A operates in a constant current mode and thereby regulates the current flowing through the LEDs to be substantially constant, proportional to the input voltage 104A. Note that the GC signal is generated based on the direct current (DC) input signal 101 and the pulse width modulated signal 103.

By one embodiment, the LED current ($I_{LED}$) provides a dynamic range on controlling a dimming of the LEDs 121. However, FET power and thermal issues can limit an amount of light intensity (i.e., brightness) that can be output by the LEDs. As such the LED driver 100 may not be feasible to operate in high-brightness applications.

Figure 1B:
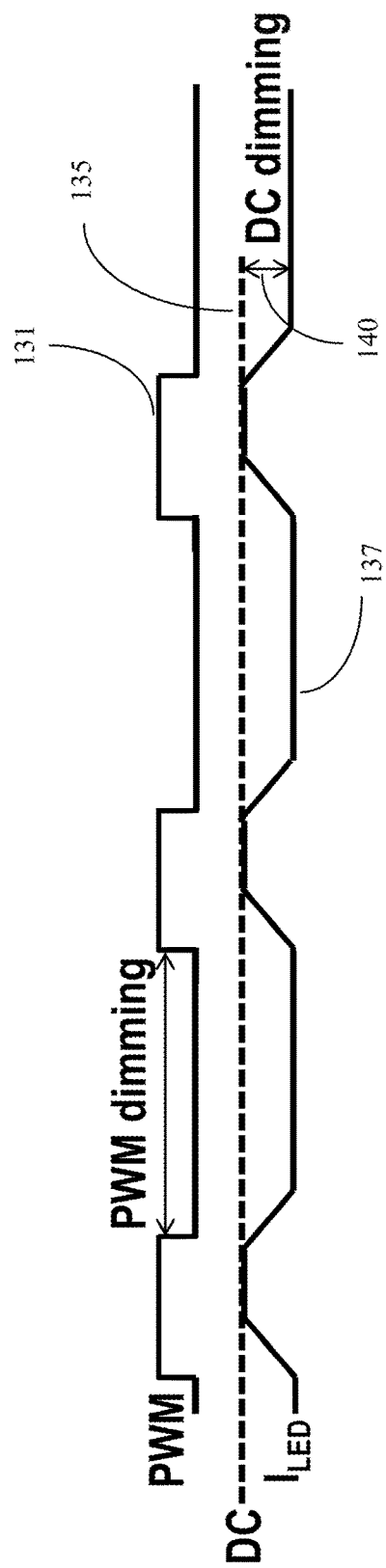
FIG. 1B is an exemplary graph of signals associated with the LED driver of FIG. 1A.

Turning to FIG. 1B, there is depicted an exemplary graph of signals associated with the LED driver 100 of FIG. 1A. Specifically, FIG. 1B depicts a pulse width modulated signal 131 that is input to the DAC 102 of the LED driver 100. Moreover, signal 135 and signal 137 correspond to the DC signal and the $I_{LED}$ current signals, respectively. As shown in FIG. 1B, a DC dimming range 140 can be extended by modifying, for instance, an OFF time-period of the PWM signal 131.

Figure 2A:
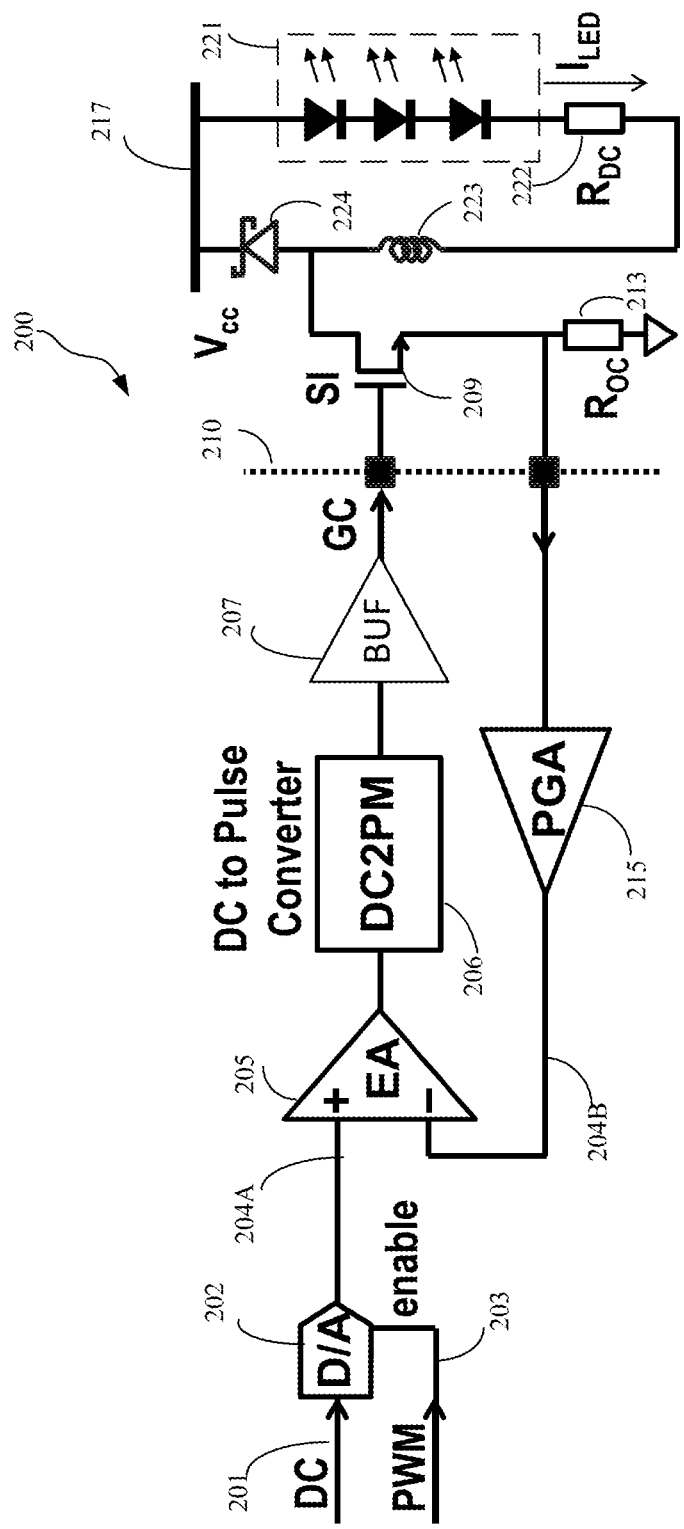
FIG. 2A depicts according to an embodiment, an exemplary schematic diagram of a LED driver.

Turning to FIG. 2A, there is depicted according to one embodiment, an exemplary schematic diagram of a LED driver 200.

An input direct current (DC) signal 201 is input to a high-resolution digital-to-analog converter (DAC) 202. A pulse-width modulated signal 203 is also input to the DAC 202 to generate a constant reference voltage signal 204A as the output of the DAC 202. The constant reference voltage signal 204A is input to a first terminal of an error amplifier (EA) comparator 205. A feedback signal 204B is input to a second terminal of the EA 205. The EA 205 computes a difference in the two input signals and transmits the difference (error) signal to a DC to pulse converter 206. The DC to pulse converter 206 is used to generate a pulse signal (ON-OFF signal) to regulate a current flowing through an inductor 223 included in the LED driver 200.

The output of the DC to pulse converter 206 is passed to a buffer 207, which is used to change a current/voltage level of the signal based on a load that is attached to the driver 200. The output of the buffer 207 is a gate control (GC) signal (e.g., a pulse signal) that regulates switching of a field-effect-transistor (FET) 209.

By one embodiment, the LED driver 200 of FIG. 2A includes a resistor ($R_{OC}$) 213 that is connected at one end, to a source terminal of the FET 209, and connected to a ground terminal at the other end. The LED driver 200 includes a high-gain feedback loop that is formed by sensing a voltage across the resistor ($R_{OC}$) 213. The sensed voltage is passed to a programmable gate amplifier (PGA) 215. As shown in FIG. 2A, the output of the PGA 215 forms the feedback signal 204B, which is input to the second terminal of the EA 205. The high-gain feedback loop provisions for generating the GC signal that drives the FET 209.

As shown in FIG. 2A, the LED driver 200 includes a resistor 222 that is coupled at one end to the inductor 223, and coupled at the other end to a load (LEDs) 221. The inductor is coupled to a flyback diode 224, which is connected to a constant voltage source 217. The FET switch 209 is coupled to the inductor 223, and is switched ON-OFF by the GC signal to regulate, in a power efficient manner, the current through the inductor 223. Thus, the LED driver 200 of FIG. 2A operates in a switched-inductor (SI) mode.

Figure 2B:
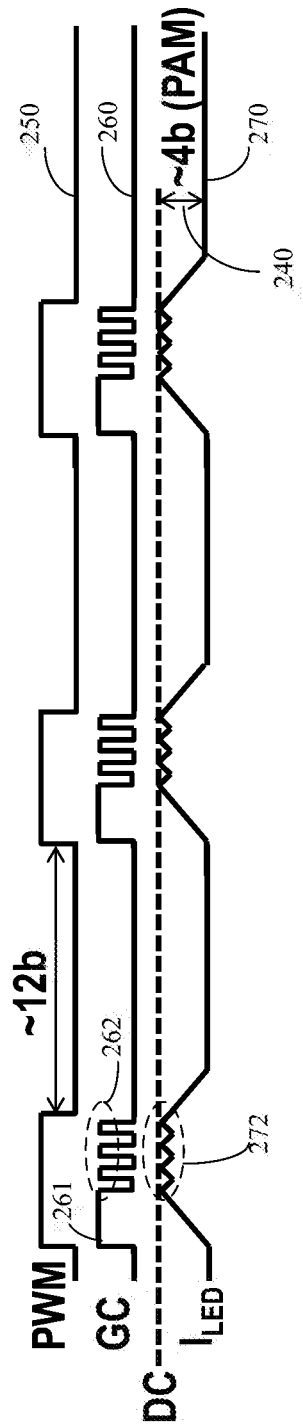
FIG. 2B is an exemplary graph of signals associated with the LED driver of FIG. 2A.

Turning to FIG. 2B, there is depicted an exemplary graph of signals associated with the LED driver 200 of FIG. 2A. Specifically, FIG. 2B depicts a pulse width modulated signal 250 that is input to the DAC 202 of the LED driver 200. Moreover, signal 260 and signal 270 correspond to the gate control signal (GC) and the $I_{LED}$ current signals, respectively. Note that the GC signal 260 includes a plurality of long duration pulses 261 and short duration pulses 262. The long and short duration pulses 261 and 261 respectively, are required to switch the FET of the LED driver 200 in order to regulate the current flowing through the inductor. Due to the series of short pulses 262, a ripple effect 272 is observed in the current ($I_{LED}$) flowing through the inductor. Due to the ripples 272 in the $I_{LED}$, a flicker in the dimming of the LEDs is observed, which may be unpleasant to the eyes of a user.

Moreover, the dimming range of the driver 200 can be controlled by modifying the width of the PWM signal 250. However, due to the ripples 272, the dynamic dimming range of the LED driver 200 is limited to a 4-6 bit level, 240, as shown in FIG. 2B. By one embodiment, the ripples 272 in the $I_{LED}$ current can be addressed by using an inductor having a large inductance value. However, such an approach of minimizing the ripples is not cost-effective. Accordingly, by one embodiment of the present disclosure, there is provided with reference to FIGS. 4A and 5, a preferred mechanism of addressing the drawbacks caused by the ripples 272.

Figure 3:
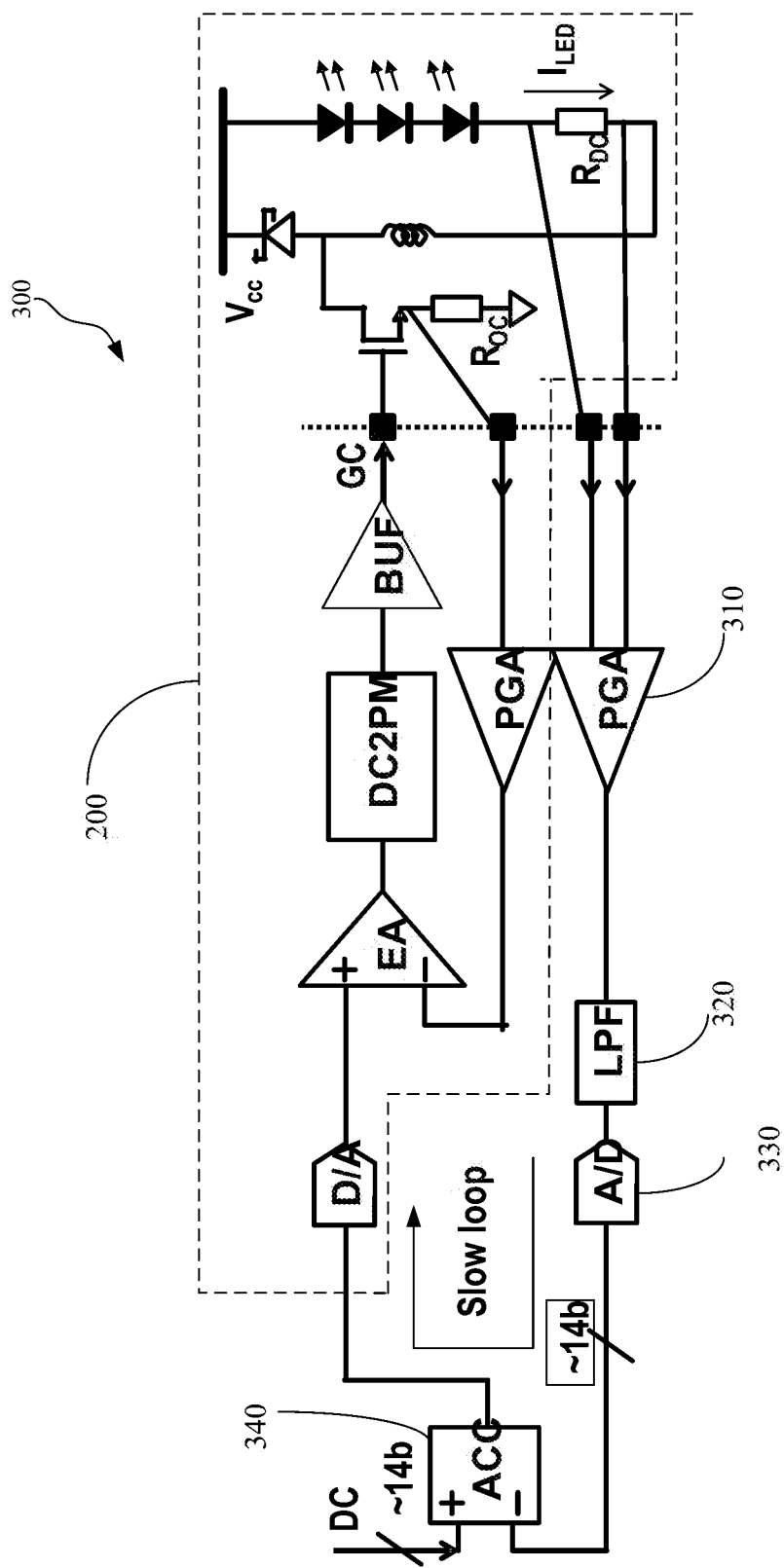
FIG. 3 depicts according to an embodiment, an exemplary schematic diagram of a LED driver.

FIG. 3 depicts an exemplary schematic diagram of an enhanced SI mode LED driver 300. The enhanced SI mode LED driver 300 includes the LED driver of FIG. 2 (shown by dotted lines), and a slow feedback loop that is used for high resolution DC dimming. For sake of repetition, the description of the LED driver 200 is not described herein again. Rather, the additional component (i.e., the slow feedback loop) is described as follows.

By one embodiment, the slow loop is added to the LED driver to allow the current ($I_{LED}$) flowing through the resistor $R_{DC}$, to be directly sensed and controlled in order to provide an efficient DC dimming mechanism. The sensing of the current $I_{LED}$ flowing thorough the resistor ($R_{DC}$), provisions for an accurate control of the current flowing through the inductor of the LED driver.

The current flowing through the resistor $R_{DC}$ is sensed and passed to a programmable gate amplifier 310. Upon amplifying the sensed current, the current is passed through a low pass filter 320 and an analog-to-digital (A/D) converter 330. By one aspect of the present disclosure, a 14-bit digital signal that is output from the A/D converter 330 is input at a first terminal to an accumulator (i.e., a comparator and integrator) 340. The DC signal is input at a second terminal of the accumulator 340, which computes a difference in the two input signals and transmits the difference (error) signal to the DAC of the LED driver. In such a manner, the inclusion of the slow-loop feedback path provisions for a mechanism of ensuring that the average current flowing through the LEDs is accurate.

However, it must be noted that having a high differential resolution feedback path can be costly due factors such as high resolution on/off chip components, the requirement of additional two pins per driver circuit board, and larger inductor size. Moreover, overvoltage issues can also occur with high voltage current sensing inputs, and the slow loop feedback path may limit the speed of some LED applications such as Li-Fi applications.

Figure 4A:
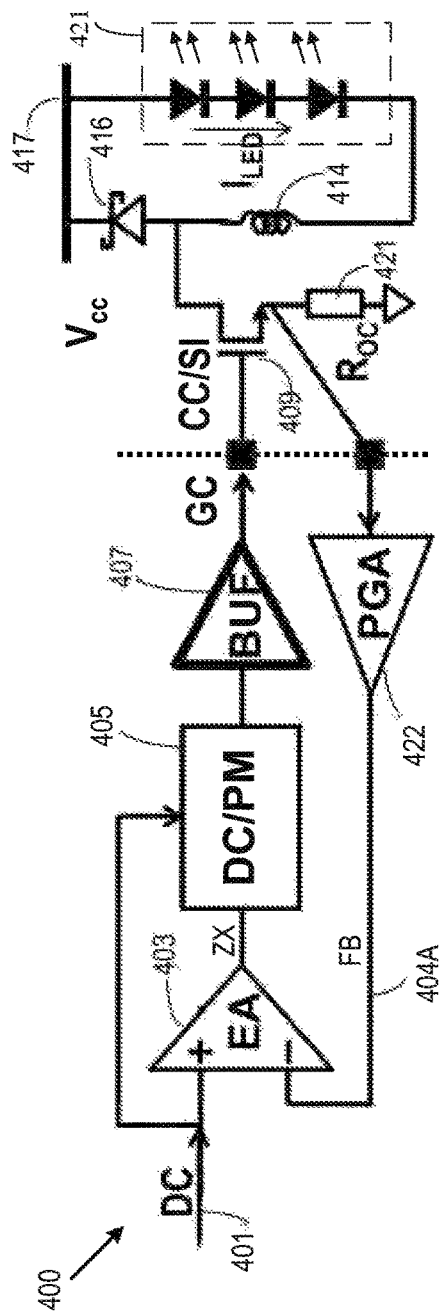
FIG. 4A depicts according to an embodiment, an exemplary schematic diagram of a LED driver.
Figure 4B:
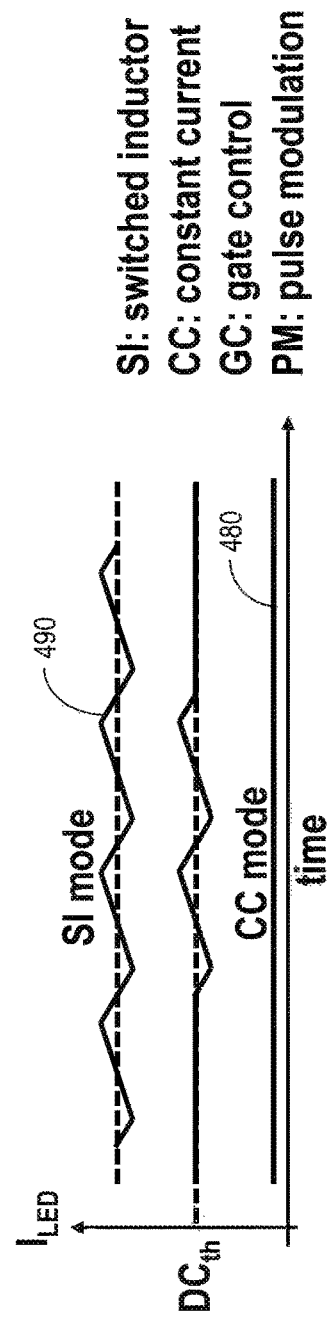
FIG. 4B is an exemplary graph of signals associated with the LED driver of FIG. 4A.

Turning now to FIG. 4A, there is depicted according to an embodiment, an exemplary schematic diagram of a LED driver 400. FIG. 4B is an exemplary graph of signals associated with the LED driver of FIG. 4A.

A direct current (DC) signal 401 is input to a first terminal of an error amplifier (EA) 403. A feedback signal (FB) 404A is input to a second terminal of the EA 403. The EA 403 computes a difference in the two input signals, and transmits the difference (error) signal to a direct current-to-pulse modulator (DC/PM) block 405. Note that the input DC signal 401 is also input directly to the DC/PM block 405. Accordingly, by one embodiment, the DC/PM block 405 can be implemented as a state machine that includes circuitry (described later with reference to FIG. 6) to select one of a DC signal and a pulse signal, respectively. Specifically, the DC/PM module 405 can be configured to select, in response to the input signal (DC) level being below a predetermined threshold, a first mode of operation of the LED driver 400, and select in response to the input signal being above the predetermined threshold, a second mode of operation of the LED driver 400.

By one embodiment, the DC/PM block 405 is configured to operate the LED driver 400 in a constant current mode in response to the input signal level being below a predetermined threshold, and in a switched inductor mode in response to the input signal being above the predetermined threshold. Details regarding the selection of the modes of operation of the LED driver 400 are described later with reference to FIG. 6. By one embodiment, the threshold is set to a level that is slightly greater than a magnitude of the ripple in the SI mode of operation. It must be appreciated that the ripple magnitude is dependent on an inductance value of the inductor employed in the SI mode of operation, and the programmable parameter $T_{OFF}$ i.e., the OFF period of the GC signal.

Moreover, the LED driver 400 of FIG. 4A includes a resistor ($R_{OC}$) 421 that is connected at one end, to a source terminal of the FET 409, and connected to a ground terminal at the other end. The LED driver 400 includes a feedback loop that is formed by sensing a voltage across the resistor ($R_{OC}$) 421. The sensed voltage is passed to a programmable gate amplifier (PGA) 422. As shown in FIG. 4A, the output of the PGA 422 forms the feedback signal 404A, which is input to the second terminal of the EA 403. The feedback loop provisions for generating the GC signal that drives the FET 209.

The LED driver 400 also includes an inductor 414 that is coupled to a load (i.e., LEDs) 421 at one end, and to a flyback diode 416 at the other end. The FET switch 409 is coupled to the inductor 414, and is switched ON-OFF by the GC signal (in a switched inductor mode of operation) to regulate, in a power efficient manner, the current through the inductor. In a constant current mode of operation of the LED driver 400, a constant current is regulated to flow through the LEDs. Accordingly, when the DC input current is greater than the predetermined voltage threshold level, the pulse modulator of the DC/PM block 405 is activated to operate the LED driver in the switched inductor mode, in order to enhance the DC dimming range of the LED driver 400.

In the switched inductor mode of operation of the LED driver 400, a pulse signal is generated by activating a pulse modulator (included in the DC/PM block 405) and passed to a buffer 407. The output of the buffer 407 is a gate control (GC) signal (e.g., a pulse signal) that regulates switching of a field-effect-transistor (FET) 409. The GC signal regulates the current flowing through the inductor 414.

In the constant current mode of operation of the LED driver 400, the DC/PM block 405 activates a low pass filter, and controls a set of parameters i.e., resistors and capacitors of the low pass filter (described later with reference to FIG. 6) to regulate/maintain a constant current level ($I_{LED}$) through the LEDs 421.

FIG. 4B is an exemplary graph of signals associated with the LED driver of FIG. 4A. In the switched inductor mode of operation of the LED driver, the current ($I_{LED}$) flowing through the LEDs has a triangular waveform like shape 490, and in the constant current mode of operation, the current ($I_{LED}$) flowing through the LEDs has a constant (i.e., uniform) shape 480. Accordingly, by switching the mode of operation of the LED driver 400 in the manner as described above provides the advantageous ability of enhancing the DC dimming range by orders of magnitude without losing power efficiency. Moreover, the LED driver 400 does not require high-resolution digital-to-analog converters, and thereby provides for additional cost savings. However, it must be noted that in some implementations, a sudden increase or decrease in the DC current (i.e., a DC jump) can occur as the LED driver 400 transitions between the constant current mode and the switched inductor mode, which can produce unpleasant visual effects or Li-Fi errors.

Accordingly, in what follows there is described by one embodiment of the present disclosure, a mechanism to avoid the unpleasant visual effects in dimming of the LEDs by ensuring a smooth transition between the two modes of operation of the LED driver 400.

Figure 5:
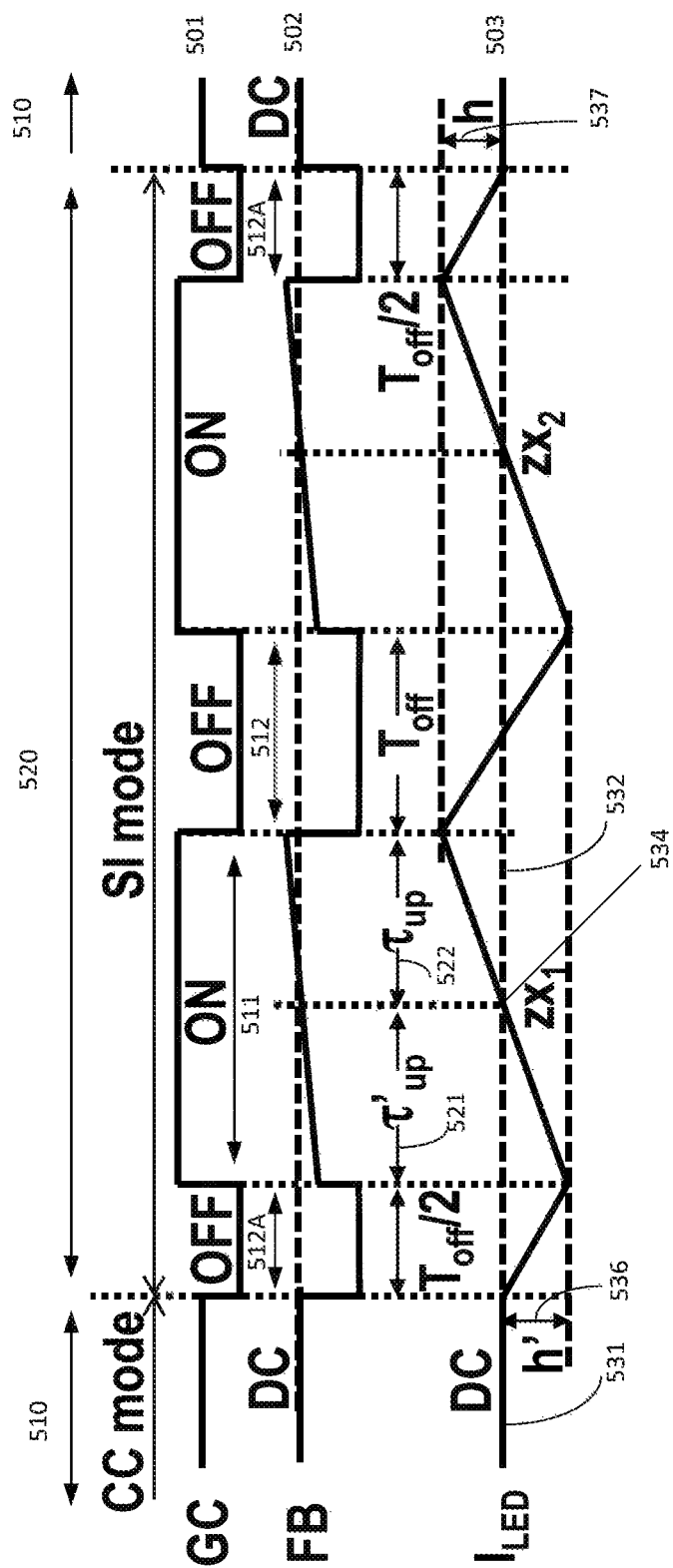
FIG. 5 is an exemplary graph of signals depicting a change in operation mode of the LED driver.

Turning to FIG. 5, there is depicted an exemplary graph of signals depicting a change in the operation mode of the LED driver 400. Specifically, as shown in FIG. 5, the gate control signal 501 drives the FET (409 in FIG. 4A) of the LED driver. The feedback signal (404A in FIG. 4A) is depicted by the signal waveform 502, and the current flowing through the LEDs ($I_{LED}$) is represented by signal waveform 503.

As stated previously, by one embodiment, in response to the input DC signal being below a predetermined threshold, the LED driver operates in a constant current (CC) mode 510, and in response to the input DC signal being above the predetermined threshold, the LED driver operates in a switched inductor mode (SI) 520. In the CC mode 510, the GC signal is constant current signal that drives the FET of the LED driver. Accordingly, the current flowing through the LEDs is maintained at a constant level 531.

In the SI mode 520, the GC signal is a pulse waveform including an ON period 511, and an OFF period ($T_{OFF}$) 512, that regulates the current flowing through the inductor (414 in FIG. 4A) of the LED driver. Note that the $I_{LED}$ current waveform 503 has a uniform shape (i.e., a constant signal level) in the CC mode of operation and a triangular shape in the SI mode of operation.

In order to ensure a smooth mode transition (i.e., from the CC mode to the SI mode, and vice versa) of the LED driver, one must ensure that a level of average current flowing through the LED in the SI mode of operation (532), is aligned with the current level 531, corresponding to a magnitude of direct current flow through the LED in the CC mode of operation. In doing so, a jump in the DC level (i.e., a mismatch) of the currents in the two modes is avoided and thus the unpleasant visual effect while dimming of the LEDs can be avoided.

By one embodiment, the duty cycle of the GC signal 501 can be controlled such that in the SI mode of operation of the LED driver, an amount of time a rising edge of the triangular waveform ($I_{LED}$) is below the current level 532 is made equal to an amount of time the rising edge of the triangular waveform is above the current level 532. In other words, the $T_{OFF}$ period 512 of the GC signal 501 can be controlled such that the time period represented as r, (522) can be made equal to the time period represented as $\tau'_{up}$ (521). In doing so, the average $I_{LED}$ current level 532 in the SI mode of operation 520 is aligned with the current level 531 through the LEDs in the CC mode of operation 510. It must be appreciated that in aligning the two current levels (531 and 532, respectively) that correspond to the CC mode 510, and the SI mode 520 of operation of the LED driver, the point in time the triangular $I_{LED}$ waveform (in the SI mode of operation) crosses the current level 532 (also referred to herein as a zero-crossing point $ZX_1$, 534) corresponds to a midpoint of the $T_{ON}$ period 511 of the GC signal 501.

According to one embodiment, aligning the current levels 531 and 532 corresponding to the CC mode and the SI mode of operation of the LED driver can also be achieved by controlling the $T_{OFF}$ period for a first cycle and a last cycle (512A) in the SI mode 520, to be exactly half in magnitude of the $T_{OFF}$ period 512 corresponding to the OFF time of any intermediate OFF periods in the GC signal 501. In doing so, amplitude (h') represented as 536, of the triangular waveform 503 in the SI mode, which is below the current level 532, is equal to an amplitude (h) 537, of the triangular waveform that is above the current level 523. In this manner, DC jumps are avoided at mode transitions of the LED driver, and thus unpleasant visual effects and Li-Fi errors are avoided.

Figure 6:
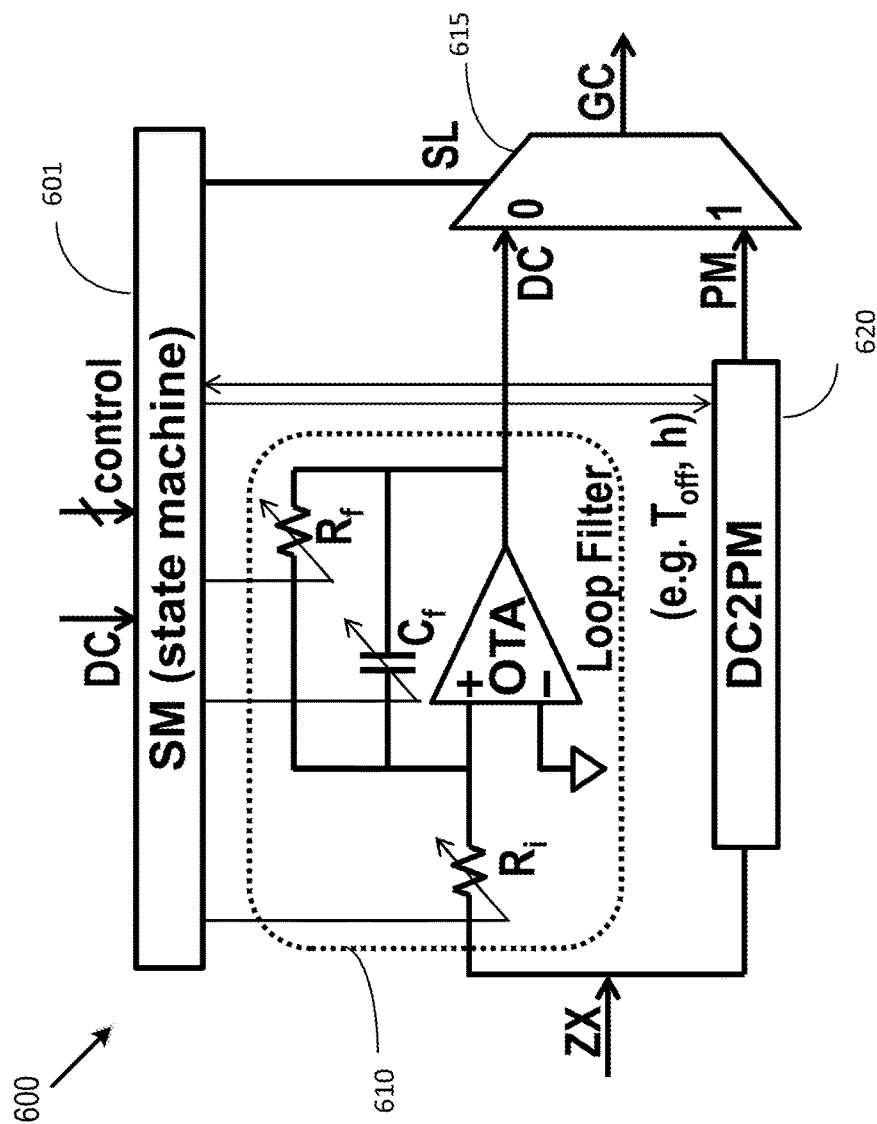
FIG. 6 is an exemplary block diagram of a driver mode control circuit for a LED driver.

FIG. 6 is an exemplary block diagram of a driver mode control circuit (DC/PM) 600 of a LED driver, such as the LED driver 400, according to certain embodiments. The DC/PM 600 includes a state machine (SM) 601 that has DC current and control signal inputs and controls the operation of the LED driver 400 in the CC mode and the SI mode.

For instance, in the SI mode, parameter such as the off-time of the FET ($T_{OFF}$), and in the CC mode, the parameters such as $R_f$, $C_f$, and $R_i$ can be tuned by the SM in real time or can be programmed to minimize mode switching transients. Note that the gain and the cutoff of the loop filter 610 are determined based on values of the resistors $R_f$ and $R_i$, and the capacitor $C_f$. In a first mode of operation (i.e., in response to the input DC signal level being below a predetermined threshold), of the LED driver 400, the state machine 601 may be configured to activate a loop filter 610 to regulate a constant current to flow through the LEDs and thus operate in a constant current mode. In a second mode of operation of the LED driver (i.e., in response to the input DC signal level being greater than the predetermined threshold), the state machine may be configured to activate a modulator (included in the DC-PM block 620) to convert the input DC signal to a pulse modulated signal (PM signal), in order to drive the FET of the LED driver. As shown in FIG. 6, the state machine 601 may select one of the DC signal and the pulse signal via a selector 615 to generate the gate control signal.

By one embodiment, the state machine 601 may be implemented by one or more processing circuits. A processing circuit includes a programmed processor (for example, a microprocessor), as a processor includes circuitry. A processing circuit may also include devices such as an application-specific integrated circuit (ASIC) and circuit components that are arranged to perform the recited functions.

The various features discussed above may be implemented by the microprocessor that is configured to select an operating mode of the LED driver. Based on an input signal level, the microprocessor may be configured to operate the LED driver in one of two modes. For instance, the microprocessor may be configured to detect (e.g., via a comparator) whether the input signal level is below a predetermined threshold. In response to the input signal level being below the threshold, the microprocessor may be configured to activate the loop filter to operate in a constant current mode. Further, in response to the detected signal level being greater than the predetermined threshold level, the microprocessor may be configured to operate the LED driver in a switched-inductor mode.

By one embodiment, the microcontroller may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The microcontroller may be configured to execute one or more sequences of one or more instructions contained in a memory (included in the microcontroller). One or more processors in a multi-processing arrangement may also be employed to execute the sequences of instructions contained in the memory. In alternative embodiments, hard-wired circuitry may be used in place of or in combination with software instructions. Thus, embodiments are not limited to any specific combination of hardware circuitry and software.

Figure 7:
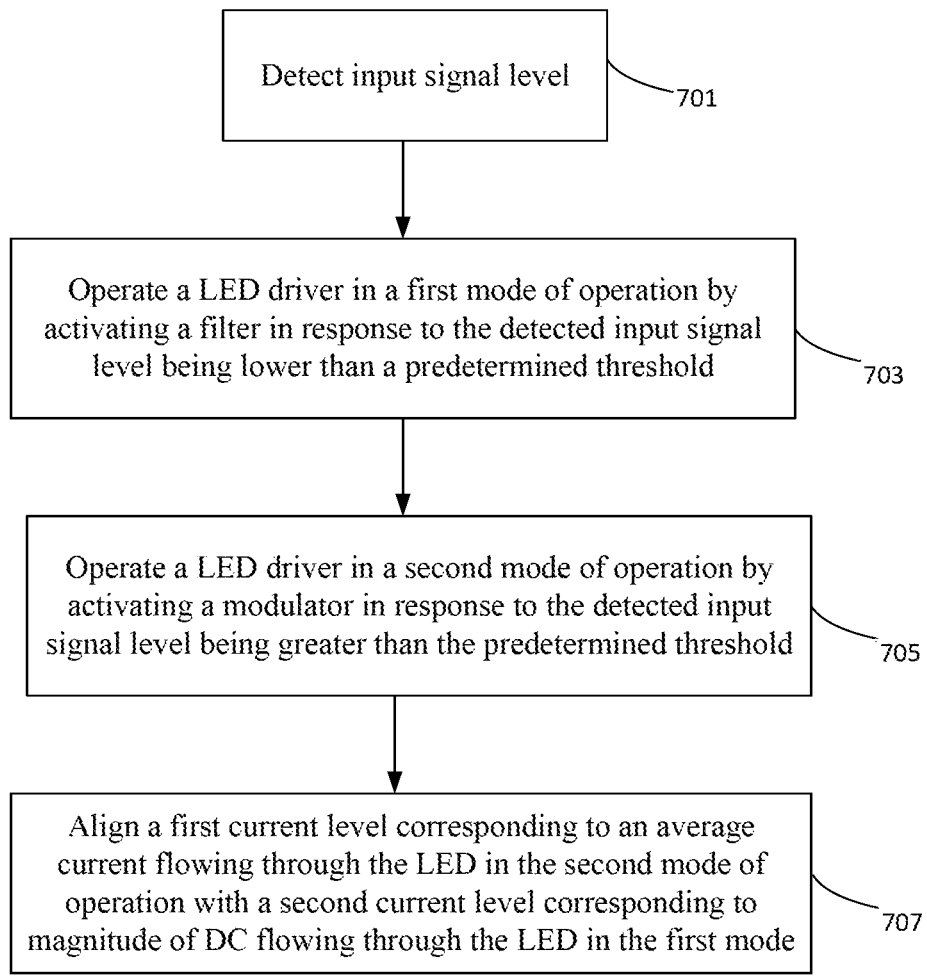
FIG. 7 depicts an exemplary flowchart illustrating the steps performed in operating an LED driver.

FIG. 7 depicts according to an embodiment, an exemplary flowchart depicting the steps performed in operating a LED driver. By one embodiment, the steps depicted in FIG. 7 can be performed by the state machine as depicted in FIG. 6.

In step 701, a level (i.e., magnitude) of an input signal of the LED driver is detected. Further, the detected signal level is compared with a predetermined threshold level to determine whether the input signal level is less than (or greater than) the predetermined threshold level.

In step 703, the state matching is configured to operate the LED driver in a first mode of operation, by activating a filter in response to the detected input signal level being lower than a predetermined threshold.

If the detected signal level is greater than the threshold level, then in step 705, the state machine can be configured to operate the LED driver in a second mode of operation. Specifically, in the second mode of operation, the state machine activates a modulator in response to the detected input signal level being greater than the predetermined threshold.

The process further in step 707, aligns a first current level corresponding to an average current flowing through the LED in the second mode of operation with a second current level corresponding to magnitude of DC flowing through the LED in the first mode. By one embodiment, the state machine may be configured to align the first current level with the second current level by the technique described previously with respect to FIG. 5. In aligning the signal levels, the state machine ensures that a sudden jump in DC levels while transitioning between the first operating mode and the second operating mode is avoided.

While aspects of the present disclosure have been described in conjunction with the specific embodiments thereof that are proposed as examples, alternatives, modifications, and variations to the examples may be made. It should be noted that, as used in the specification and the appended claims, the singular forms "a," "an," and "the" include plural referents unless the context clearly dictates otherwise.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. Additionally, an implementation may be performed on modules or hardware not identical to those described. Accordingly, other implementations are within the scope that may be claimed.

The invention claimed is:

1. A device comprising:
   circuitry configured to
   determine, based on an input signal level, one of a first mode of operation and a second mode of operation for a light-emitting-diode (LED) driver;
   activate a loop-filter associated with the first mode of operation of the LED driver in response to the input signal level being below a predetermined threshold;
   activate a pulse modulator associated with the second mode of operation of the LED driver in response to the input signal level being above the predetermined threshold; and
   align a first current level corresponding to an average current flowing through the LED in the second mode of operation, with a second current level corresponding to a magnitude of direct current flowing through the LED in the first mode of operation.

2. The device of claim 1, wherein the first mode of operation of the LED driver is a constant-current mode, and the second mode of operation of the LED driver is a switched inductor mode.

3. The device of claim 1, wherein the circuitry is configured to align the first current level with the second current level by adjusting a duty cycle of a gate control signal that drives a field effect transistor of the LED driver.

4. The device of claim 3, wherein the square shaped waveform has an ON period and an OFF period, and wherein a midpoint of a rising edge of the triangular waveform occurs at a time instant corresponding to half of the ON period of the square shaped waveform.

5. The device of claim 4, wherein in the second mode of operation of the LED driver, an amount of time a rising edge of the triangular waveform is below the first current level is equal to an amount of time the rising edge of the triangular waveform is above the first current level.

6. The device of Claim 4, wherein the square shaped waveform has an ON period and an OFF period, and wherein a midpoint of a rising edge of the triangular waveform occurs at a time instant corresponding to half of the ON period of the square shaped waveform.

7. The device of claim 6, wherein the circuitry is configured to align a midpoint of a rising edge of the triangular waveform to coincide with the first current level.

8. A method of operating a light-emitting-diode (LED) driver, the method comprising:
   determining by circuitry, based on an input signal level, one of a constant current mode of operation and a switched inductor mode of operation for the LED driver;
   activating by the circuitry, a loop-filter associated with the constant current mode of operation of the LED driver in response to the input signal level being below a predetermined threshold;
   activating by the circuitry, a pulse modulator associated with the switched inductor mode of operation of the LED driver in response to the input signal level being above the predetermined threshold; and
   aligning by the circuitry, a first current level corresponding to an average current flowing through the LED in the switched inductor mode of operation, with a second current level corresponding to a magnitude of direct current flowing through the LED in the constant current mode of operation.

9. The method according to claim 8, wherein the circuitry is configured to align the first current level with the second current level by adjusting a duty cycle of a gate control signal that drives a field effect transistor of the LED driver, and wherein in the switched inductor mode of operation of the LED driver, a current flowing through the LED has a triangular waveform shape, and the gate control signal that drives the field effect transistor of the LED driver has a square shaped waveform.

10. The method according to claim 9, wherein the circuitry is configured to align a midpoint of a rising edge of the triangular waveform to coincide with the first current level.

11. The method according to claim 9, wherein the square shaped waveform has an ON period and an OFF period, and wherein a midpoint of a rising edge of the triangular waveform occurs at a time instant corresponding to half of the ON period of the square shaped waveform.

12. The method according to claim 9, wherein in the switched inductor mode of operation of the LED driver, an amount of time a rising edge of the triangular waveform is below the first current level is equal to an amount of time the rising edge of the triangular waveform is above the first current level.

13. An apparatus comprising:
a filter configured to operate a light-emitting-diode (LED) driver in a first mode of operation, the filter being activated in response to an input signal level being below a predetermined threshold;
a pulse modulator configured to convert the input signal into a pulse signal, and operate the LED driver in a second mode of operation based on the pulse signal, the pulse modulator being activated in response to the input signal level being greater than the predetermined threshold; and
circuitry configured to align a first current level corresponding to an average current flowing through the LED in the second mode of operation, with a second current level corresponding to a magnitude of direct current flowing through the LED in the first mode of operation.

14. The apparatus of claim 13, wherein in the first mode of operation of the LED driver, a gate control signal is a constant direct current signal that drives a field-effect-transistor (FET) of the LED driver, and in the second mode of operation of the LED driver, the gate control signal is a pulse signal that regulates an amount of current flowing in a plurality of LEDs coupled to the LED driver.

15. The apparatus of claim 14, wherein pulse signal includes a plurality of cycles, each cycle including an ON period and an OFF period, a duration of the OFF period of a first cycle and a last cycle of the plurality of cycles being half in magnitude of the duration of OFF periods corresponding to other cycles.

16. The apparatus of claim 13, wherein in the first mode of operation of the LED driver, a first current flowing through the LEDs has a uniform shape, and in the second mode of operation of the LED driver, a second current flowing through the LEDs has a triangular waveform shape.

17. The apparatus of claim 13, wherein the circuitry is configured to align a midpoint of a rising edge of the triangular waveform to coincide with the first current level, a first amplitude of the triangular waveform below the first current level being equal to a second amplitude of the triangular waveform above the first current level.

* * * * *